(12) United States Patent
Schmit et al.

(10) Patent No.: US 6,624,893 B1
(45) Date of Patent: Sep. 23, 2003

(54) CORRECTION OF SCANNING ERRORS IN INTERFEROMETRIC PROFILING

(75) Inventors: Joanna Schmit, Tucson, AZ (US); Artur Olszak, Tucson, AZ (US)

(73) Assignee: Veeco Instruments Inc., Tucson, AZ (US)

( * ) Notice: Subject to any disclaimer, the term of this patent is extended or adjusted under 35 U.S.C. 154(b) by 0 days.

(21) Appl. No.: 09/875,638

(22) Filed: Jun. 6, 2001

(51) Int. Cl.[7] .............................................. G01B 11/02

(52) U.S. Cl. ...................................................... 356/511

(58) Field of Search ................................. 356/511, 497

(56) References Cited

U.S. PATENT DOCUMENTS

| | | | | | |
|---|---|---|---|---|---|
| 5,471,303 A | * | 11/1995 | Ai et al. | ...................... | 356/497 |
| 5,953,124 A | * | 9/1999 | Deck | .......................... | 356/497 |
| 5,956,141 A | * | 9/1999 | Hayashi | ...................... | 356/511 |
| 5,999,263 A | * | 12/1999 | Deck et al. | .................. | 356/511 |
| 6,031,612 A | * | 2/2000 | Shirley | ........................ | 356/511 |

OTHER PUBLICATIONS

Schwider, J. et. al. "Digital wave–front measuring interferometry: some systematic error sources." Applied Optics, vol. 22, No. 21, Nov. 1, 1983, pp. 3421–3432.*

Creath, Katherine. "Temporal Phase Measurement Methods," Interferogram analsys, Institute of Physics, Bristol, 1993, pp. 94–140.*

Harasaki, Akiko, et. al. "Improved vertical scanning interferometry." Applied Optics, vol. 39, No. 13, 1st May, 2000, pp. 2107–2115.*

K. Creath, "Temporal Phase Measurement Methods," Interferogram Analysis, Institute of Physics Publishing Ltd., Bristol, 1993, pp. 94–140.

K. G. Larkin, "Efficient Nonlinear Algorithm for Envelope Detection in White Light Interferometry," J. Opt. Soc. Am., A/vol. 13, 832–843, 1996.

A. Harasaki et al., "Improved Vertical Scanning Interferometry," Appl. Opt. 39, 2107–2115, 2000.

Schwider et al., "Digital Wavefront Measuring Interferometry: Some Systematic Error Sources," Applied Optics, vol. 22, 3421–3422, 1983.

S. Kim et al., "Accelerated Phase–Measuring Algorithm of Least Squares for Phase Shifting Interferometry," Optical Engineering, vol. 36, 3101–3106, 1997.

Huntley et al., "Phase–Shifted Dynamic Speckle Pattern Interferometry at lkHz," Applied Optics, vol. 38, No. 31, Nov. 1, 1999.

Kenneth Womack, "Interferometric Phase Measurement Using Spatial Synchronous Detection," SPIE, vol. 0429, 1983.

Schmit et al., "Fast Calculation of Phase in Spatial N–Point Phase–Shifting Techniques," SPIE, vol. 2544, 1995.

* cited by examiner

*Primary Examiner*—Robert H. Kim
*Assistant Examiner*—Thomas R Artman
(74) *Attorney, Agent, or Firm*—Antonio R. Durando; Durando Birdwell & Janke, PLC

(57) ABSTRACT

Interferometric measurements are carried out in conventional manner to produce a correlogram corresponding to successive scanner steps. An approximation of the actual scan-step size between frames is calculated from multiple-frame intensity data collected around the frame of interest using common irradiance algorithms. The scan-step size so measured is then used in standard PSI, VSI or PSIOTF algorithms, instead of the scanner's nominal phase step. According to one embodiment, the invention utilizes a five-frame PSI algorithm to produce an average scan-step size of four scan steps. According to another embodiment, the phase step between frames is calculated directly utilizing a novel five-frame algorithm that produces an approximation of actual phase step for a given frame, rather than an average value of four steps around the frame. The method requires reduced data processing and can advantageously be applied "on-the fly" as intensity data are acquired during scanning.

27 Claims, 20 Drawing Sheets

CORRECTION OF SCANNING ERRORS IN INTERFEROMETRIC PROFILING

BACKGROUND OF THE INVENTION

1. Field of the Invention

This invention is related in general to the field of scanning interferometry and, in particular, to a novel approach for correcting motion errors in the scanning arm of an interferometer.

2. Description of the Related Art

Conventional scanning interferometry utilizes a light source, such as white light or a laser beam, to produce interference fringes at a light detector as the optical path difference (OPD) between a test surface and a reference surface is varied during a vertical scan. All measurement techniques based on phase-shifting interferometry (PSI), vertical-scanning interferometry (VSI, also referred to as white-light interferometry), and phase-shifting interferometry on-the-fly (PSIOTF) rely on an analysis of the interference between two beams of light. One beam (the object beam) is reflected from the sample; the other beam (the reference beam) is reflected from the reference mirror; and the two beams are recombined to create an interference pattern (the interferogram) at each scanning step. A detector (usually a CCD camera) registers the interferogram in a number of frames while the optical path difference (OPD) between the interfering beams is changing in a predefined fashion, which is realized either by moving the object, or by scanning the interferometric objective or the reference mirror at a preferably constant speed. The resultant shape of the sample object is calculated based on the intensity patterns in the interferograms and can be used to describe the height profile of the sample.

PSI is preferably used for measurements of smooth surfaces with small changes in profile (see K. Creath, "Temporal Phase Measurement Methods," Interferogram Analysis, Institute of Physics Publishing Ltd., Bristol, 1993, pp. 94–140). VSI is generally used to measure smooth and/or rough surfaces with large interpixel height ranges (K. G. Larkin, "Efficient Nonlinear Algorithm for Envelope Detection in White Light Interferometry," J. Opt. Soc. Am., A/Vol. 13, 832–843 (1996). The combination of VSI and PSI in used in the PSIOTF technique to improve measurements of smooth surfaces in the medium height range (A. Harasaki et al., "Improved Vertical Scanning Interferometry," Appl. Opt. 39, 2107–2115, 2000).

In VSI the interference fringes are localized only in a small region around the focus because of the low coherence source or the high numerical aperture of the microscope objective employed. While scanning through focus, fringes for different parts of the sample surface are produced and analyzed resulting in an unambiguous measurement of the object shape. As well understood by those skilled in the art, the height information from a low-coherence interferogram can be retrieved in many ways, such as, for example, by peak detection of the coherence envelope or fringe, by calculation of the centroid of the intensity signal, or by determination of the slope of the phase of the average wavelength. All these methods of analysis estimate the best vertical-scan focus position for a given pixel by sensing the coherence peak and utilize this information to determine the relative height difference between pixels (that is, a height profile of the test surface).

In PSI techniques the interference fringes are examined only around a single focus position using typically a quasi-monochromatic light source, such as a laser. Algorithms employed to analyze PSI fringes produce phase measurements that may be ambiguous (because of so-called $2\pi$ ambiguities) and therefore require further processing to remove the ambiguity by unwrapping the phase data. Because of this limitation, only objects with relatively small inter-pixel height differences can be measured using conventional PSI analysis. On the other hand, the advantage of PSI versus VSI techniques is that PSI allows for more precise measurements.

The PSIOTF technique affords the high precision of PSI combined with the lack of ambiguity of VSI measurements. Accordingly, this combined technique is often utilized for determining the shape of smooth surfaces with large height differences (that is, surfaces with steep profiles). The procedure first involves finding a coarse focus position for each pixel using a VSI technique; then a PSI algorithm is applied to the intensity data collected at frames around this focus position to achieve a high precision measurement where the $2\pi$ ambiguity has already been resolved by VSI. The PSIOTF technique can be used with a low-coherence light source or with a combination of both a low- and a high-coherence source. In addition, the technique can be applied to each pixel individually or to groups of pixels in separate areas, as in the case of a stepped sample with separate smooth and flat regions.

All of these techniques require a well-calibrated and, preferably, a constant scanning motion of the sample object along the optical axis because the height calculations are based on the scanning distance traveled between interferogram frames. Scanner miscalibration, nonlinearities and vibrations affect the surface-profile measurements produced by PSI, VSI and PSIOTF algorithms by attributing an incorrect size to each scanner step. Thus, the rate of change in the OPD, normally referred to in the art as the "phase step," needs to be well calibrated in order to achieve an accurate measurement. The most commonly used algorithms for the three interferometric techniques mentioned here require a predefined, nominal phase step which, once the scanner is calibrated, is assumed to remain constant along the whole scan for each measurement. However, this is not always the case and the errors in scanning speed influence the final result and need to be accounted for accurate measurements.

A common example of a source of scanning error is linear phase-step miscalibration, where the phase step is constant but different than the calibrated phase step, which may produce height magnification errors (in VSI), residual ripples (in PSI), or a saw-tooth profile (in PSIOTF). Such effects may be visible in the calculated profile. For example, FIGS. 1A and 1B show a saw-tooth effect in the phase map (x and y profiles, respectively) of a chromium-coated step height standard using a PSIOTF technique. Phase step miscalibration was present, causing saw-tooth effects following the fringes. The PSI phase calculated around each frame reflects real changes in the optical path, but the frame number position is only assumed based on the device's calibrated phase step; therefore, a correction is needed for a precise profile measurement. Improved calibration and a feed-back loop control in the scanner system have been the conventional approaches used to reduce this source of error. FIGS. 2A,2B and 3A,3B illustrate similar scanner-error effects produced by VSI and PSI techniques, respectively.

Another example of a scanning-error source is high frequency vibrations, which introduce random errors in the intensity values of the interferograms. They may also produce a decrease of fringe contrast, residual ripples, or a saw-tooth profile in all interferometric measurement techniques. The most common way of reducing of this type of error is through better vibration isolation, such as with air tables and a more rigid structure for the instrument.

Low-frequency vibrations, miscalibration, and nonlinearity in the scanner motion result in erroneous height-difference readings, which may produce ripples, or a saw-tooth profile, or height magnification errors. In practice, these errors cannot be easily corrected. In addition, they are usually not repeatable from measurement to measurement; therefore, they are the most difficult errors to correct. Thus, eliminating or reducing the influence of these errors would be a great advance in the art.

Various studies have characterized the errors associated with scanning perturbations and improved algorithms have been developed to reduce sensitivity to these error sources, but all state-of-the-art corrective techniques require intense calculations that greatly affect processing speed. For example, U.S. Pat. No. 5,953,124 describes a technique for correcting scanning nonlinearities using the three-dimensional interferogram produced by a completed vertical scan. The phase history determined within the coherence region of each pixel during the scan is temporally unwrapped to remove $2\pi$ ambiguities, and overlapping temporal phase histories gathered from different pixels are connected to produce a measured phase history for the entire scan range. This measured phase history is then compared to the temporal phase change nominally produced by each scanner step to correct the height profile of the test surface. The approach produces corrected results that account for scanner nonlinearities, but it requires unwrapping of the phase data and complex post-scan data manipulation. These requirements prevent utilization of the method on-the-fly and further increase time, storage, and data-processing demands.

Thus, there is still a need for a more direct and computationally fast approach to correcting the errors introduced by nonlinearities, miscalibration, or vibrations at each scanner step, so that a correct height profile can be determined on the basis of the actual, rather than the nominal, position history of the scanning mechanism. This invention provides a simple solution to this problem by focusing on the actual phase step occurring between scanning frames.

BRIEF SUMMARY OF THE INVENTION

One primary objective of this invention is an improved method for measuring the actual size of each phase step between consecutive frames produced by the scanning mechanism of an interferometric profiler.

Another important goal of the invention is a method that does not require storage of the entire three-dimensional interferogram produced by a vertical scan, nor the post-scan processing of these data, to identify scanning errors due to nonlinearities or other error sources.

In particular, another goal is an approach that does not require phase calculation and unwrapping as intermediate steps to phase-step correction.

A final objective is a method that can be readily implemented in conventional interferometric profilers and that is equally suitable for correction of PSI, VSI, or PSIOTF techniques.

Therefore, according to these and other objectives, the present invention consists of performing a vertical scan of the test surface in conventional manner to produce multiple frames of interferograms corresponding to successive scanner steps; that is, a correlogram is developed for each pixel.

Regardless of the technique employed for calculating the surface profile (PSI, VSI, or PSIOTF), at each frame for which sufficient intensity data are available for a pixel, the actual scan-step size between frames is calculated from the intensity data collected around the frame of interest. For example, any of several algorithms normally used for scanner calibration is suitable for determining the actual step size between successive frames captured by the scanner. Thus, a true history of actual scan-step sizes and actual frame positions can be accumulated for the entire scan, so long as sufficient overlaps of coherence regions for different pixels exist to provide continuity of data. The true scan-step sizes so measured are then used in standard PSI, VSI or PSIOTF algorithms, instead of the nominal phase step, to calculate the test surface profile.

The scan-step size can be calculated directly using a common irradiance algorithm (such as conventionally used in PSI calibration procedures) that utilize multiple-frame intensity data. According to one embodiment, the invention utilizes a five-frame algorithm that produces an average scan-step size of four scan steps around the frame of interest. This method is direct and fast because it only requires processing of five intensity values at each frame. According to another embodiment of the invention, the phase step between frames is calculated directly utilizing a novel five-frame algorithm that produces an improved approximation of the actual phase-step size at a given frame, rather than an average value of four steps around the frame. The phase step is then converted to scan-step sizes, thereby providing a frame-by-frame measure of each actual step size of the scan. Since the nominal phase step used in scanners is typically $\pi/2$, this approach does not require phase unwrapping for nearly linear scanners. Therefore, these methods require minimal data processing and can advantageously be applied "on-the fly" as intensity data are acquired during scanning. Multiple scan steps can be calculated from any or all pixels with overlapping coherence regions and an average can be used to improve the reliability of the procedure. If coherence discontinuities exist, so that certain frames in the correlogram do not provide sufficient information to calculate the actual scan-step size, the nominal phase step can be used without correction in those regions or an average or interpolated scan-step size calculated from adjacent frames can be substituted therefor. In either case, the corrected scanner position history produces improved results over the use of calibrated, nominal phase steps utilized in the algorithms to calculate the test-surface profile.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The present invention lies in the realization that scanner errors due to nonlinearities or phase-step miscalibration can be corrected directly and with relatively simple data processing by calculating the exact size of each scan step between successive frames of the correlogram generated by the scan using the same intensity information obtained to produce the height profile of the test surface. By the application of an appropriate algorithm to intensity data gathered during the scan, each step size can be calculated either on-the-fly, or after the scan is completed, and then substituted for the nominal phase step of the scanner to produce a corrected vertical scan-position history.

As used in the art, the term "correlogram" corresponds to the three-dimensional set of interferograms produced by a multistep scan during a conventional interferometric measurement. For the purposes of this disclosure, "nominal" phase step and "nominal" scan step refer to the design phase step and the corresponding design scan step, respectively, of the scanner in question. For processing convenience, the nominal phase step of current interferometric apparatus is typically calibrated to produce a phase change of $\pi/2$ or $3\pi/2$ at the mean wavelength $\lambda$ being used, with a corresponding optical-axis nominal scan step of $\lambda/8$ and $3\lambda/8$, respectively.

Figure 4:
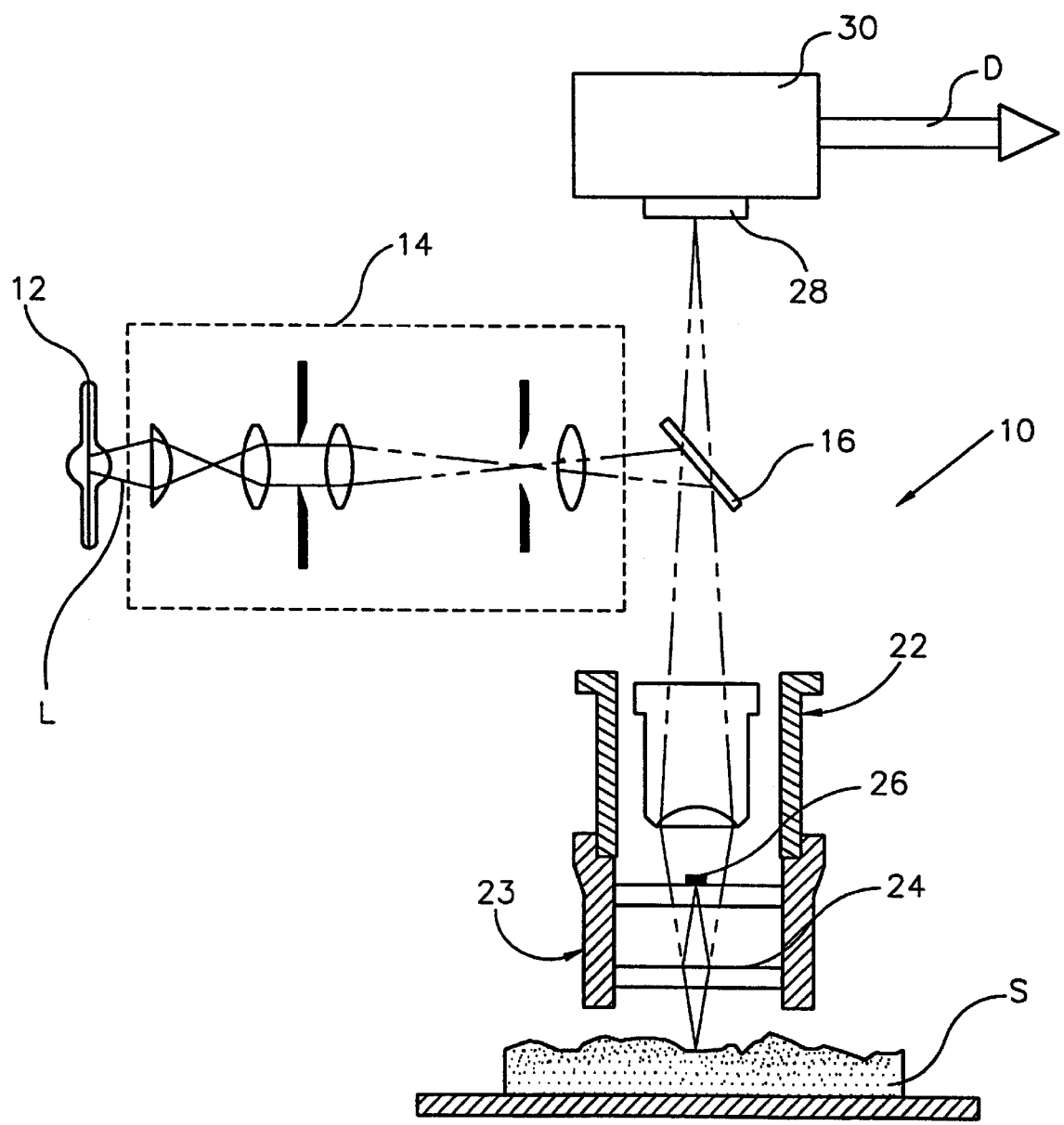
FIG. 4 is a schematic representation of a conventional interferometric profiler.

The invention is described with reference to x, y and z orthogonal coordinates wherein x and y define the plane approximately parallel to the test surface and z defines the vertical-scanning direction, but it is obvious that the structure and operation of the features detailed in this specification can be rotated in any direction with equivalent results. Referring to the drawings, wherein like parts are designated throughout with like numerals and symbols, FIG. 4 illustrates in schematic view the basic configuration of a conventional interference microscope. The interferometer 10 comprises a light source 12 directing a beam of light through an illuminator 14 toward a beam splitter 16, which reflects the light in the direction of a test surface S. The light reflected by the beam splitter 16 passes through a microscope objective 22 focused on the test surface S. The objective incorporates an interferometer 23, such as Mirau, comprising a beam splitter 24 and a reference mirror 26 adapted for relative movement with respect to the test surface, so that two light beams are generated for producing interference fringes as a result of the optical path difference between the reference mirror and the test surface S. The beams reflected from the reference mirror 26 and the test surface S pass back up through the optics of the microscope objective 22 and through the beam splitter 16 to a solid-state detector array 28 in a camera 30 in coaxial alignment with the objective 22. Typically, the detector array 28 consists of individual CCD cells or other sensing apparatus adapted to produce a two-dimensional array of digitized intensity data D corresponding to light signals received at each sensor cell as a result of the interference of the coherent light beams reflected from individual x-y coordinates or pixels in the surface S and from corresponding coordinates in the reference mirror 26. Appropriate electronic hardware (not shown) is provided to transmit the digitized intensity data D generated by the detector to a microprocessor for processing. The microscope objective 22, as well as the interferometer typically incorporated within it, is adapted for vertical movement to focus the image of the test surface on the detector array 28.

Figure 5:
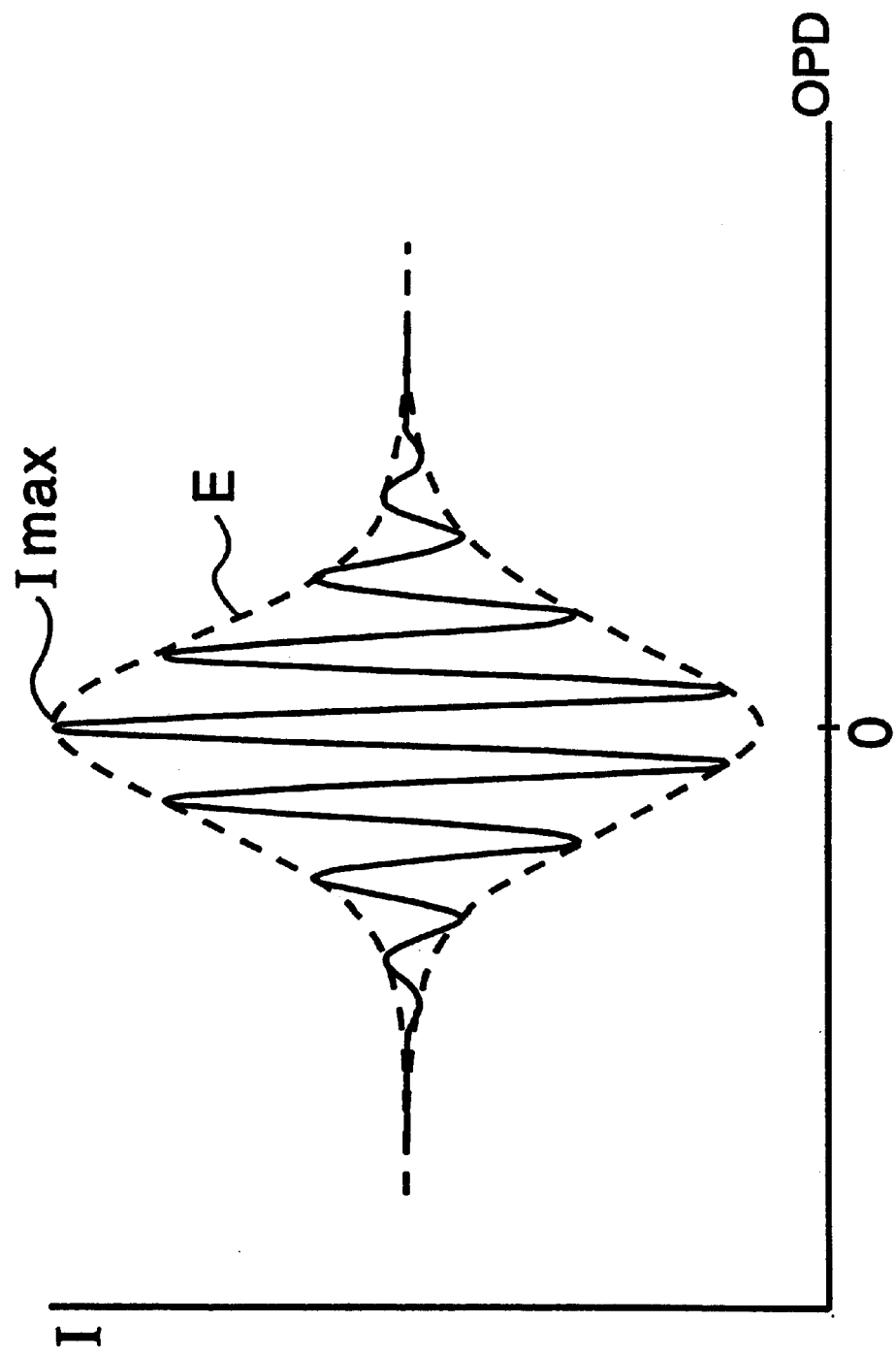
FIG. 5 is a typical intensity signal obtained from a detector cell or pixel in the image plane of an interferometer as the OPD is varied by scanning the reference mirror or the test sample along the objective's optical axis.

The apparatus of FIG. 4 can be used to carry out VSI as well as PSI or PSIOTF measurements, depending on the type of light emitted by the source 12 and the processing routines utilized in the system. For the purposes of illustrating the present invention, the source 12 is assumed to be broadband, such as white light. Accordingly, at each pixel location (i.e, at each location coordinate on the test surface and correspondingly on the detector surface) the distribution of the intensity along the scan direction can be approximated locally as sinusoidal and, if scanning errors are present, the signal will differ from this theoretical profile. As is well understood by those skilled in the art, the correlogram generated by a scan at each pixel can be treated as a temporal interferogram with a sampling frequency equal to the nominal sampling rate. The modulation, or visibility of the fringes drops off rapidly from its maximum value at minimum OPD. FIG. 5 shows a typical intensity signal (irradiance I) obtained from a detector cell in the image plane of the interferometer as the OPD is varied by scanning the reference mirror (or the sample) along the optical axis.

Figure 6:
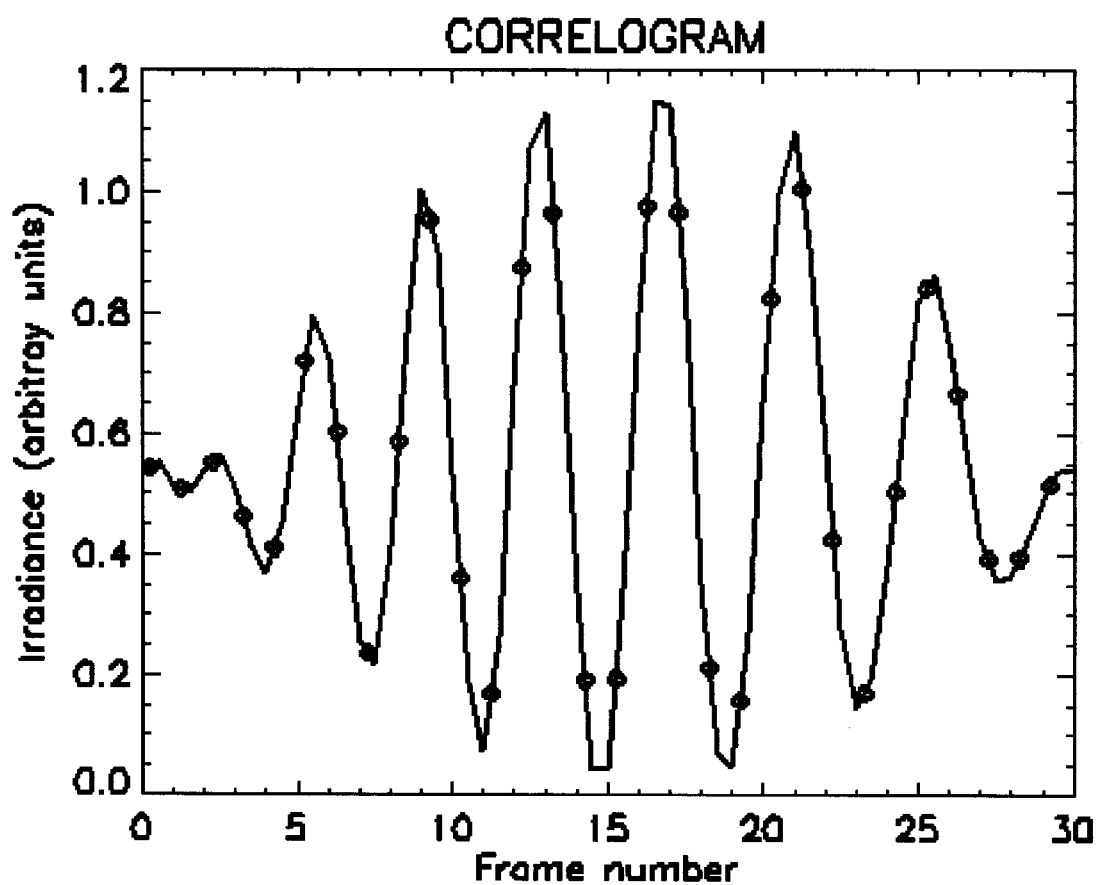
FIG. 6 illustrates a sequence of frames of intensity data from a correlogram corresponding to a detector cell used to calculate a scan-step size according to the invention, where the intensity data were collected with a nominally linear scanner at nominal phase steps of 90 degrees.

Since all interferometric techniques involve an initial calibration of the scanner accomplished by calculating the distance between frames corresponding to each scanning step, several algorithms are available in the art to determine the scan-step size between frames. With irradiance data used in conventional PSI analysis, for example, an average step size between frames can be calculated from a few intensities registered at each pixel using one of several well known algorithms. For instance, the Schwider algorithm (see Schwider et al., "Digital Wavefront Measuring Interferometry: Some Systematic Error Sources," Applied Optics, vol. 22, 3421–3422, 1983) produces the average phase step (in radians) of four steps between five consecutive frames as follows:

$$\Delta\Phi_{avg} = \arccos(I5-I1)/[2(I4-I2)], \quad (1)$$

where I1–I5 are five consecutive frames (1–5) of intensity data measured for a given pixel around the frame of interest (typically frame 3 in the sequence of 5, but the value could be used equivalently with respect to any intermediate step between frames 1 and 5). A sequence of frames as utilized by this algorithm is illustrated in FIG. 6.

Since meaningful data can be collected only within regions with sufficient contrast (i.e., within the coherence region of the light source), the modulation of the signal over a few frames is advantageously calculated for each pixel using the well-known modulation expression, $$\text{modulation}=3sqrt[4(I4-I2)^2+(I1+I5-2I3)^2]/(I1+I2+2I3+I4+I5) \quad (2)$$

and then the modulation is compared with a preset threshold for validation. The phase-step calculation algorithm is then applied using only data from frames where the modulation is above the threshold level. Thus, the average local phase step can be calculated along the scan anywhere the interference signal allows for it, as measured by Equation (2), and the PSI calibration routine of Equation (1) can be used advantageously to find the scanner position/motion characteristic along the registered correlogram for each pixel within the coherence region of the light used.

This technique is simple because the application of Equations 1 and 2 to any consecutive five-frame data points where the modulation is above the preset threshold yields an average phase step between those frames in the correlogram. The clear advantage of the technique is that the phase step can be calculated during the scan with each consecutively collected frame and the resulting calculated step-size values can then be used with any interferometric technique "on-the-fly" to obtain an immediate improved measurement over that produced with a nominal phase step. That is, whether PSI, VSI or PSIOTF is being implemented, the step sizes produced by Equations 1 and 2 can be used directly in the processing routines instead of the nominal scanner values. As well understood in the art, phase steps between frames (expressed in radians) can routinely be converted to scanner step sizes (expressed in nm or other length dimension) when the information about the wavelength of the light used is taken into account.

Thus, according to the invention, the phase step calculated for each frame with Equation 1 (or any equivalent irradiance algorithm) can be used instead of the nominal phase step in the algorithm utilized to calculate frame and correlogram-peak location in VSI analysis or in the VSI portion of PSIOTF analysis. In PSI analysis, the $\Delta\Phi_{avg}$ can similarly be used instead of the nominal phase step in the PSI algorithm to obtain more precise phase data. Note that the phase data so produced could then be used to calculate new phase steps by interstep phase differentiation, which in turn could be utilized again in the PSI algorithm to improve the phase values produced by it. The process could be repeated recursively to further refine the phase information. Although not yet tested, this iterative approach is expected to be particularly useful when phase is calculated with a PSI algorithm that already utilizes measured phase steps, rather than nominal phase steps. (See, for example, S. Kim et al., "Accelerated Phase-Measuring Algorithm of Least Squares for Phase Shifting Interferometry," Optical Engineering, vol. 36, 3101–3106, 1997.)

The scanner step sizes calculated from correlograms of different pixels for the same frames (i.e., in the same x,y plane) represent the same scanner step and ideally should be identical. In practice, though, measurement and computational approximations may produce slightly different results; therefore, they can be averaged in some conventional manner to reduce random errors. For those portions of the scan for which the scan step size is not or cannot be calculated (such as where the frame is outside the coherence region of the light source), an average value from surrounding scan steps along the correlogram (i.e., along the scan dimension z) may be assumed, or an interpolation scheme may be equivalently employed. Again, averages of values from multiple pixels can be used to reduce random errors. As would be obvious to one skilled in the art, fringes must be visible somewhere in the field of view at each frame in order to have continuous information throughout the scan. This may require that a large tilt be introduced for samples with steps in the measured surface.

Figure 7:
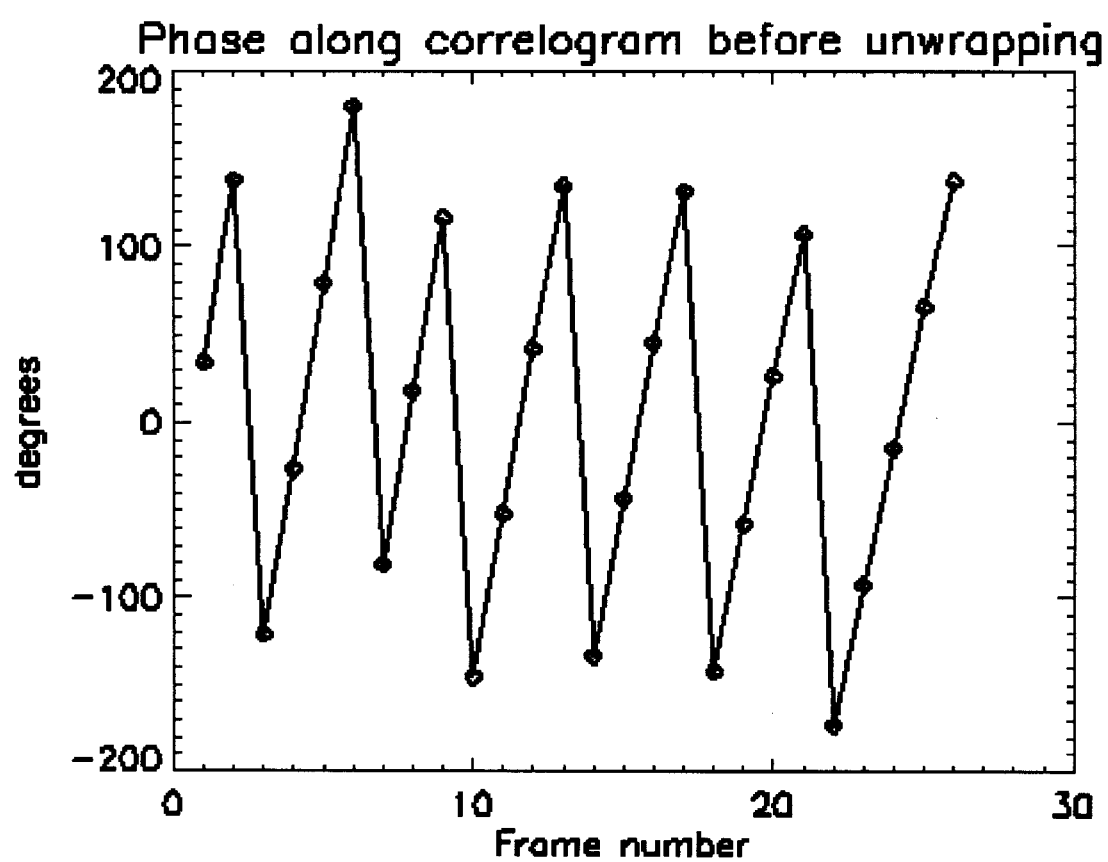
FIG. 7 is a graph of phase values corresponding to the correlogram of FIG. 6 calculated numerically with a conventional PSI algorithm.
Figure 8:
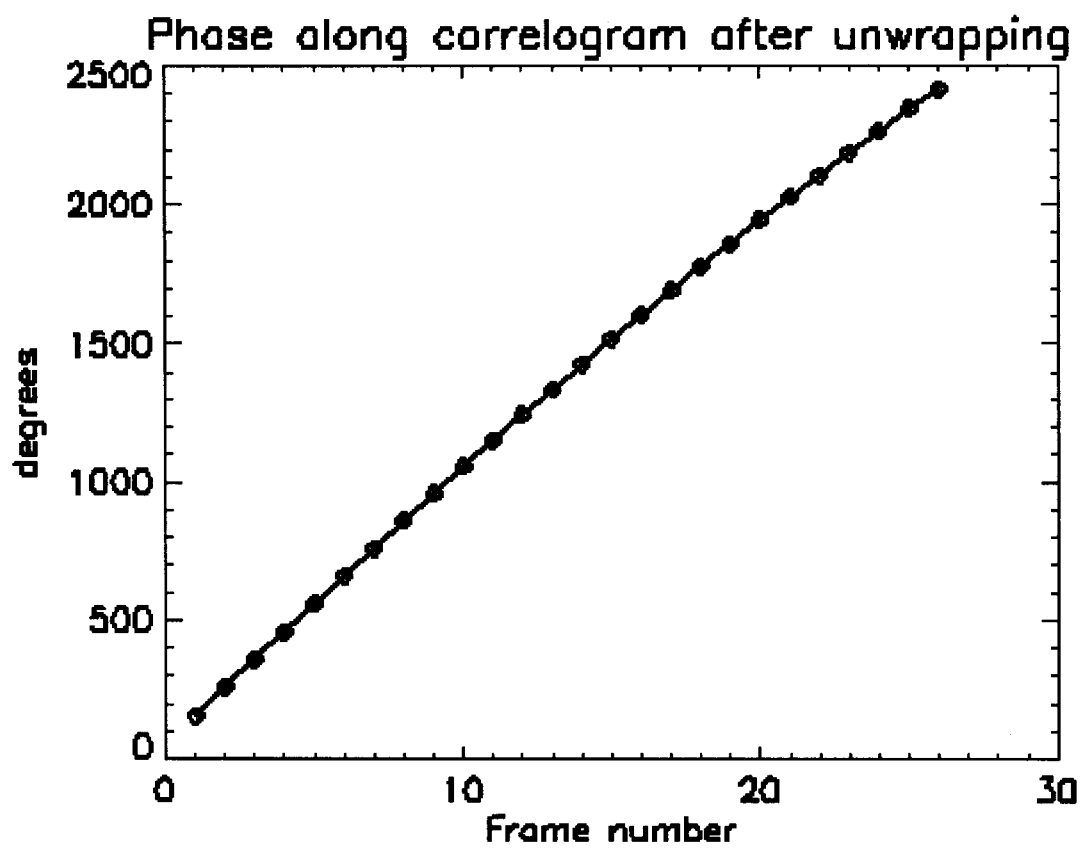
FIG. 8 is a plot of a temporally unwrapped phase history corresponding to the phase values of FIG. 6.

It is noted that the temporal unwrapping with stitching procedure described in U.S. Pat. No. 5,953,124 produces a better approximation of actual phase step than the average phase step described above. As such, the result is more desirable, but it cannot be used on-the-fly. As mentioned, the method involves collecting intensity data over an entire correlogram at predetermined frames separated by the nominal phase step, as illustrated in FIG. 6, and calculating a corresponding phase value for each frame, as shown in FIG. 7. The phase values are then unwrapped in conventional manner, as illustrated in FIG. 8. From the unwrapped phase history of FIG. 8, the approximate actual phase step is calculated for each step simply by taking the difference between successive phase values, frame by frame. The result is illustrated by curve 40 in FIG. 9.

Figure 9:
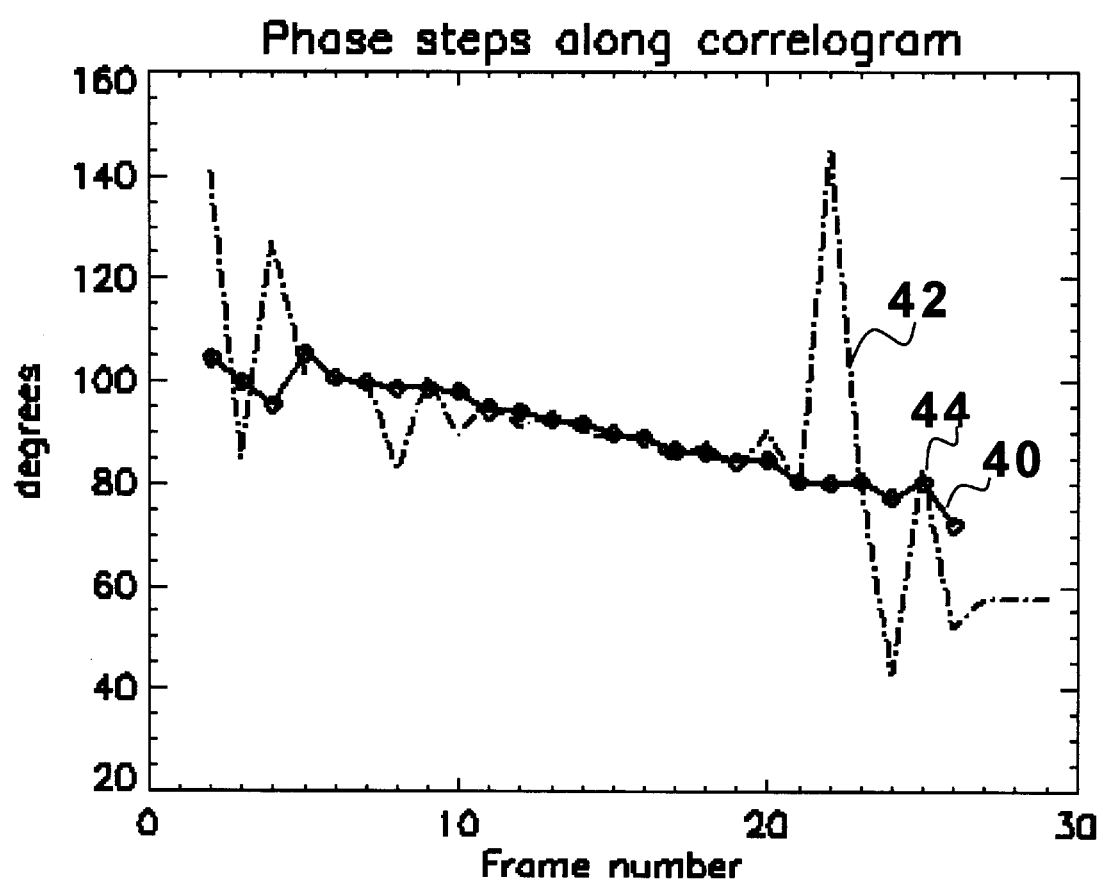
FIG. 9 is a plot of actual phase steps calculated for each frame by taking the difference between successive phase values in FIG. 7.

Curve 42 in FIG. 9 illustrates the approximate phase-step results calculated on-the-fly using Equation 1 with the same intensity data used to generate curve 40. The latter is clearly a more realistic representation of the near-linear motion of the scanner, thereby illustrating the desirability of using specific phase-step values at each frame, rather than averages, for the purposes of the present invention. Thus, it would be very desirable, for the purpose of the invention, to be able to produce an approximation of actual phase steps on-the-fly based on a sequence of current intensity values.

According to another, preferred embodiment of the invention, an alternative to Equation 1 has been developed for directly calculating an approximation of the phase step between frames from a sequence of intensity data collected during the scan. Conventional numerical phase calculations are carried out using the well-known arctan function having the general form:

$$\Phi=\arctan(N/D), \quad (3)$$

where N and D are numerical approximations of $\int_o^{2\pi}I(z)\sin(z)dz$ and $\int_o^{2\pi}I(z)\cos(z)dz$, respectively; z is the scanner position; and I(z) is the intensity measured at scan position z. For example, a commonly used five-frame algorithm for a system having a nominal phase step of $\pi/2$ is given by $$N=2(I4-I2) \text{ and} \quad (4)$$

$$D=(I1-2I3+I5), \quad (5)$$

where I1–I5 are again five intensity values for consecutive frames (1–5) measured for a given pixel. However, the phase step $\Delta\Phi_n$ between frames n and n−1 is simply equal to $\Phi_n-\Phi_{n-1}$. Accordingly, through trigonometric manipulation of the quantity $\tan(\Phi_n-\Phi_{n-1})$, the following general expression is derived:

$$\tan(\Phi_n-\Phi_{n-1})=(N_nD_{n-1}-D_nN_{n-1})/(N_nN_{n-1}+D_nD_{n-1}), \quad (6)$$

from which the phase step of interest can be calculated directly as follows:

$$\Delta\Phi_n=\Phi_n-\Phi_{n-1}=\arctan(N_nD_{n-1}-D_nN_{n-1})/(N_nN_{n-1}+D_nD_{n-1}), \quad (7)$$

where the indices n and n−1 in the numerator N and the denominator D correspond to the frames n and n−1 between which the phase step $\Delta\Phi_n$ is being calculated. In addition to being more precise than the arccosine function of Equation 1, this algorithm, being based on an arctangent function, is also known to be more numerically stable and less susceptible to noise in the irradiance data.

Since in typical correlograms the phase between two consecutive frames is measured at a nominal phase step of 90 degrees ($\pi/2$), it is very unlikely that the measured phase step will ever exceed $|\pi|$. Thus, this approximation of actual phase step can be calculated at each step of the scan and immediately used in the algorithm of choice for any interferometric calculation, rather than using the nominal step value and assuming for simplicity that it remains constant.

Data points 44 in FIG. 9 show the step sizes calculated using Equation 7. It is clear that the procedure of the invention produces results equivalent to those obtained by post-scan temporal unwrapping, stitching and phase differentiation (illustrated for the same data by curve 42), but it can be performed to produce step phases on-the-fly. Therefore, Equation 7 is preferred to implement the present invention. As would be understood by one skilled in the art, it is noted that the exact form of N and D could be selected from any conventional or newly-developed PSI or other irradiance-based algorithm. Thus, the most appropriate algorithm can be selected to obtain the desired degree of precision within the processing limitations of a given interferometric system.

Figure 1A:
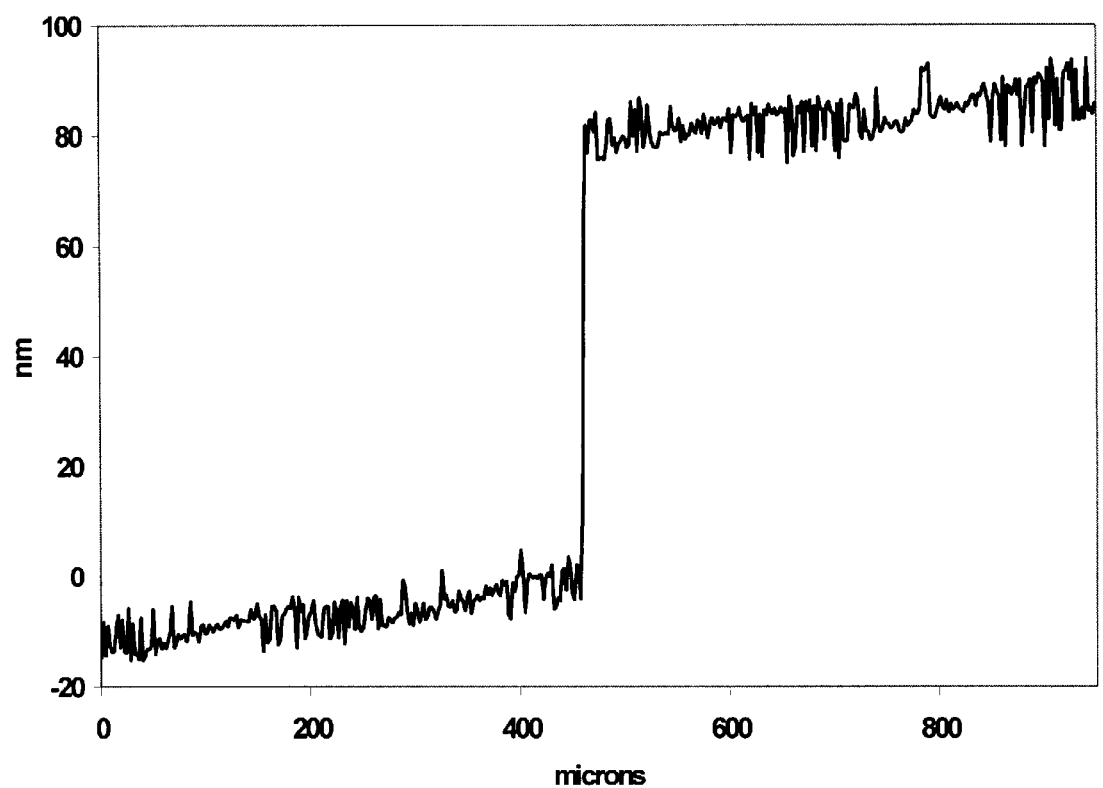
FIGS. 1–3 show profiles of chromium-coated step height standards using PSIOTF, VSI, and PSI techniques, respectively, to illustrate phase-step miscalibrations evidenced by the saw-tooth, error-magnification, and ripple effects following the fringes.
Figure 1B:
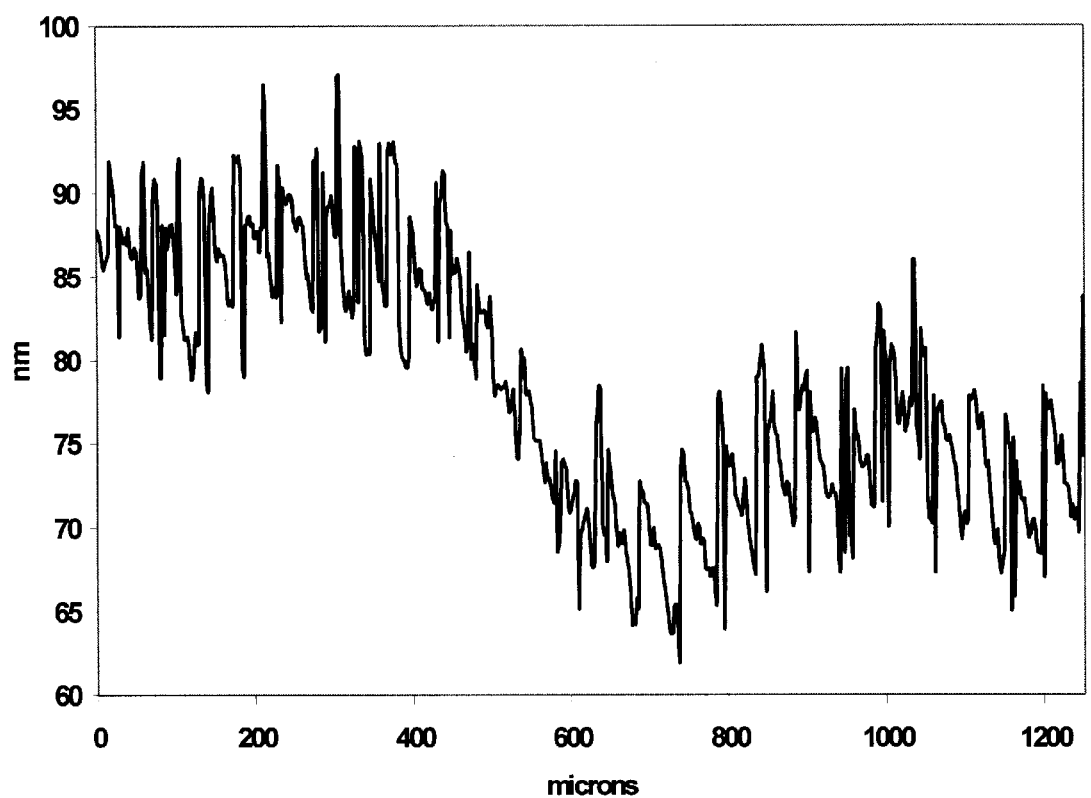
Figure 2A:
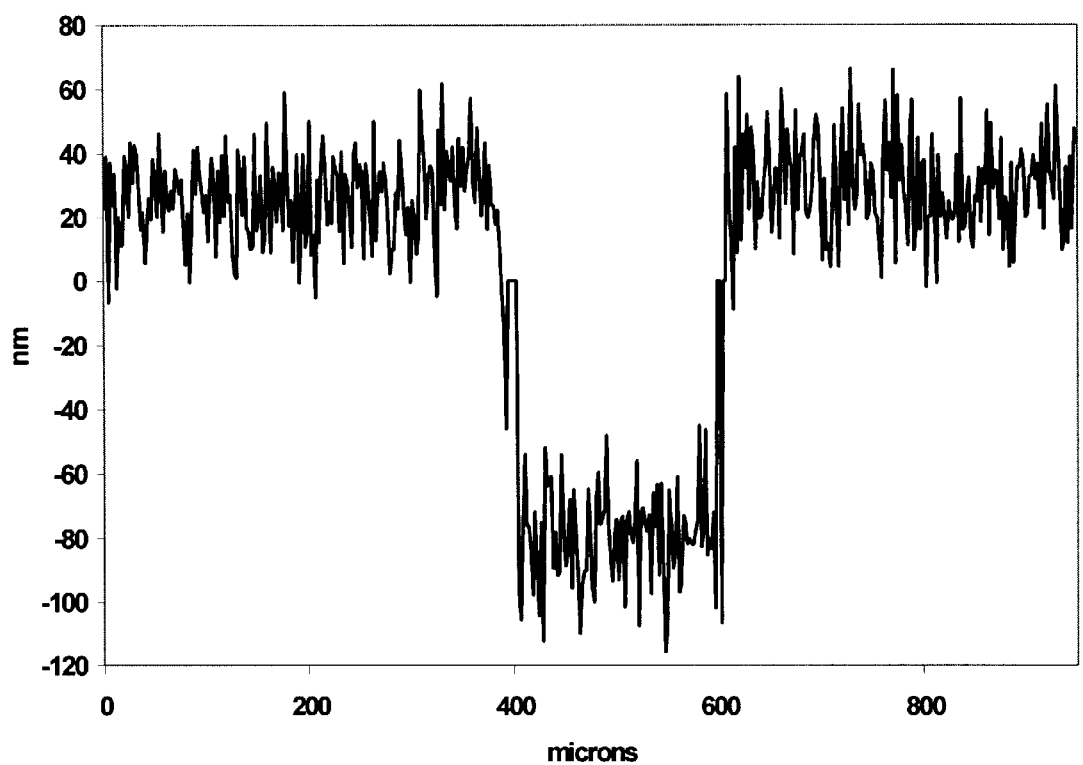
Figure 2B:
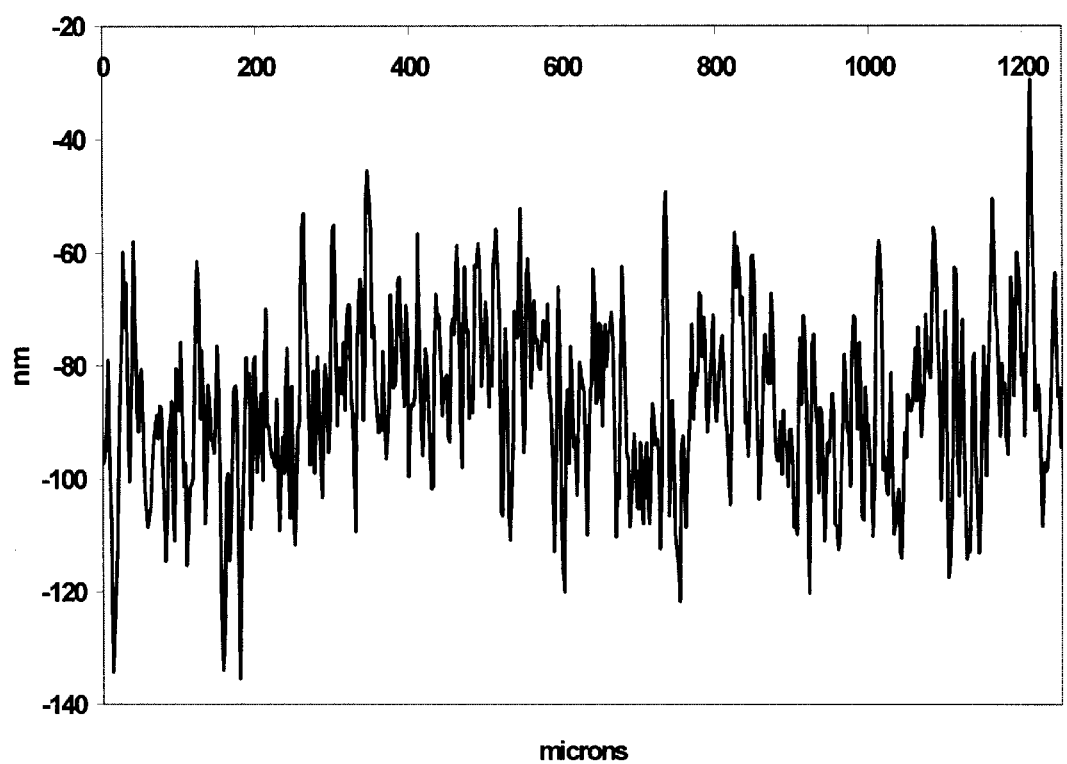
Figure 3A:
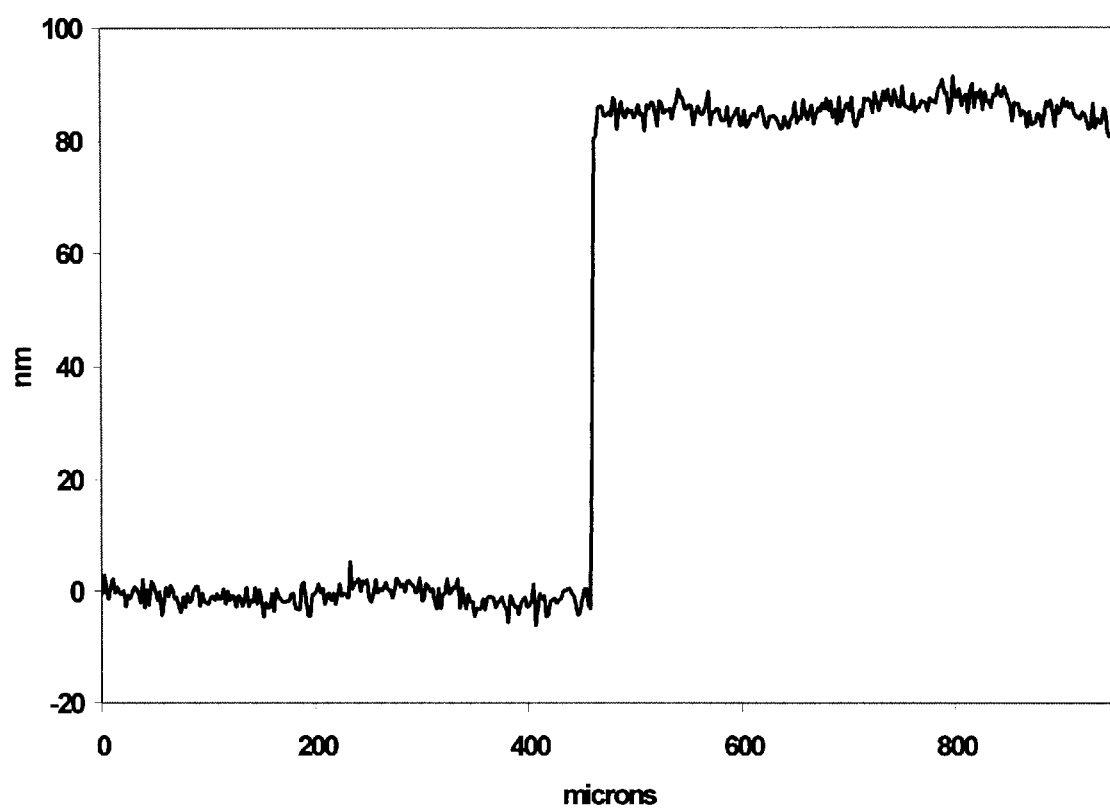
Figure 3B:
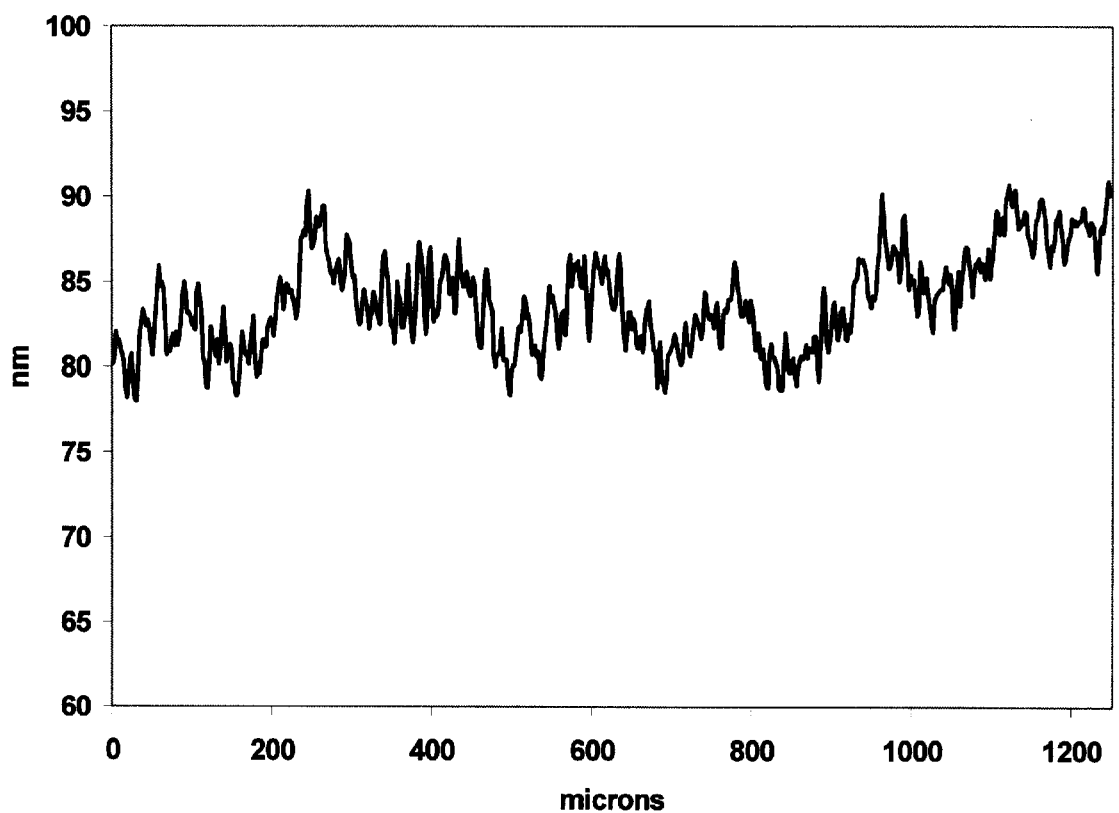
Figure 10A:
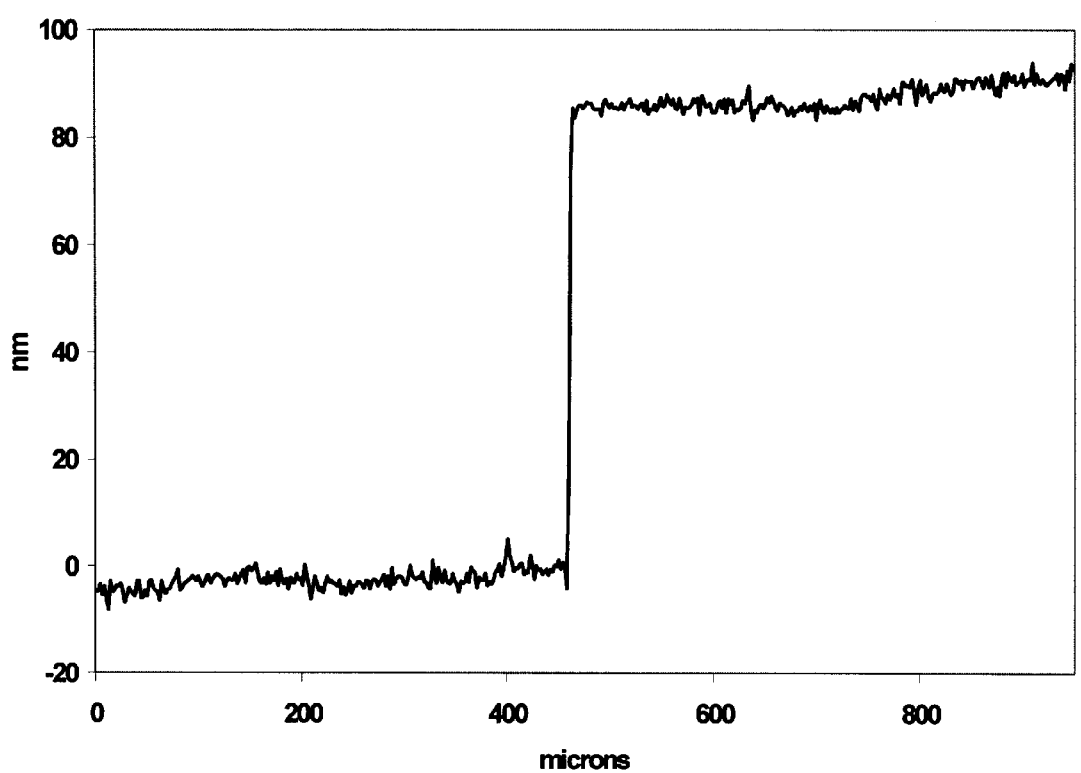
FIGS. 10–12 show profiles of the same step surfaces of FIGS. 1–3 obtained using PSIOTF, VSI, and PSI techniques, respectively, after scanning-error correction according to the present invention.
Figure 10B:
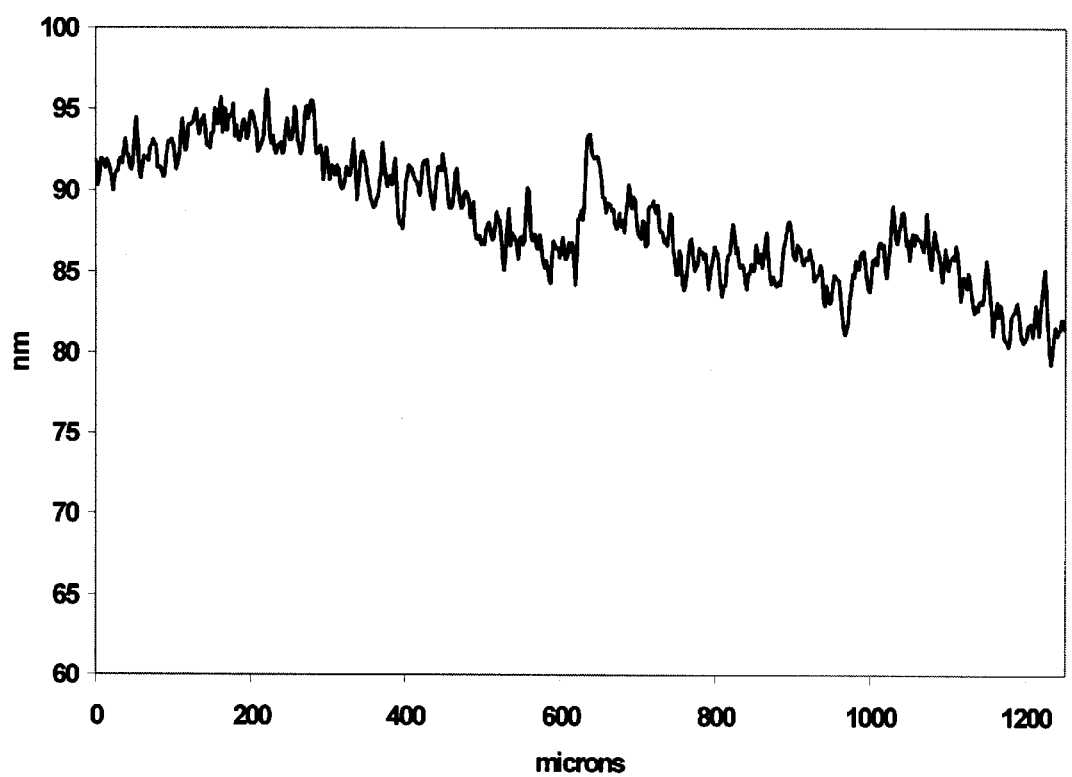
Figure 11A:
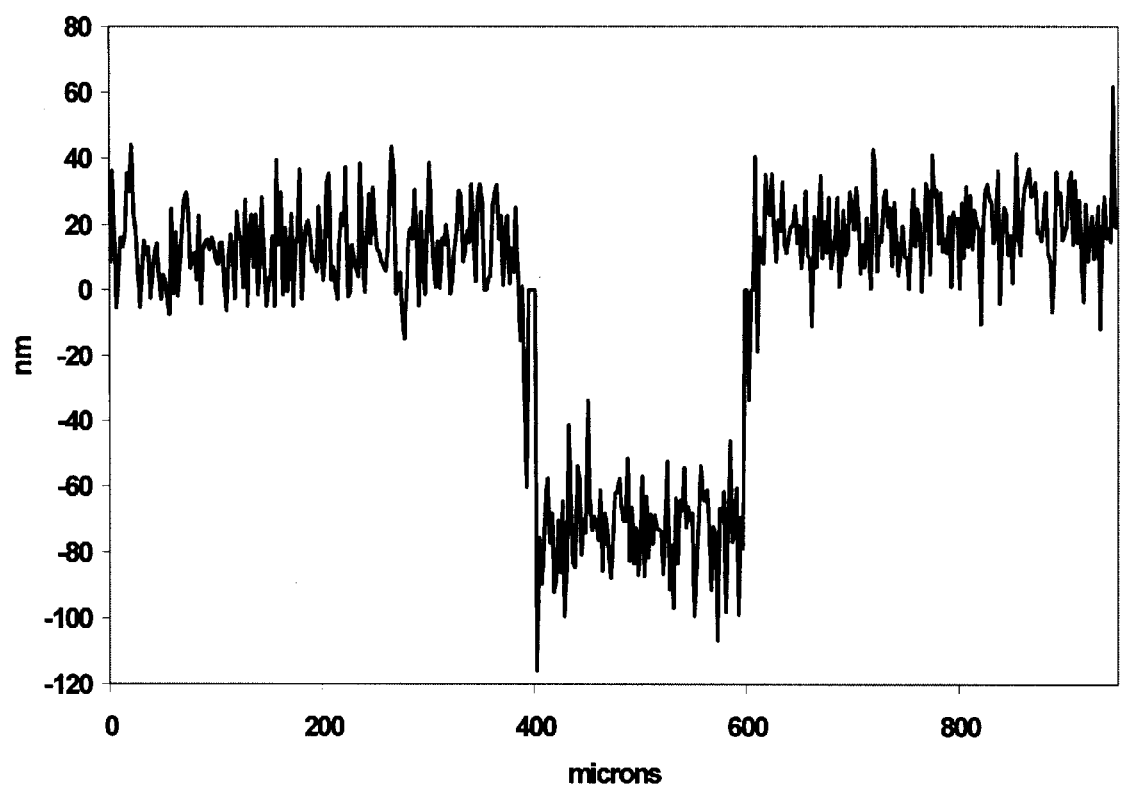
Figure 11B:
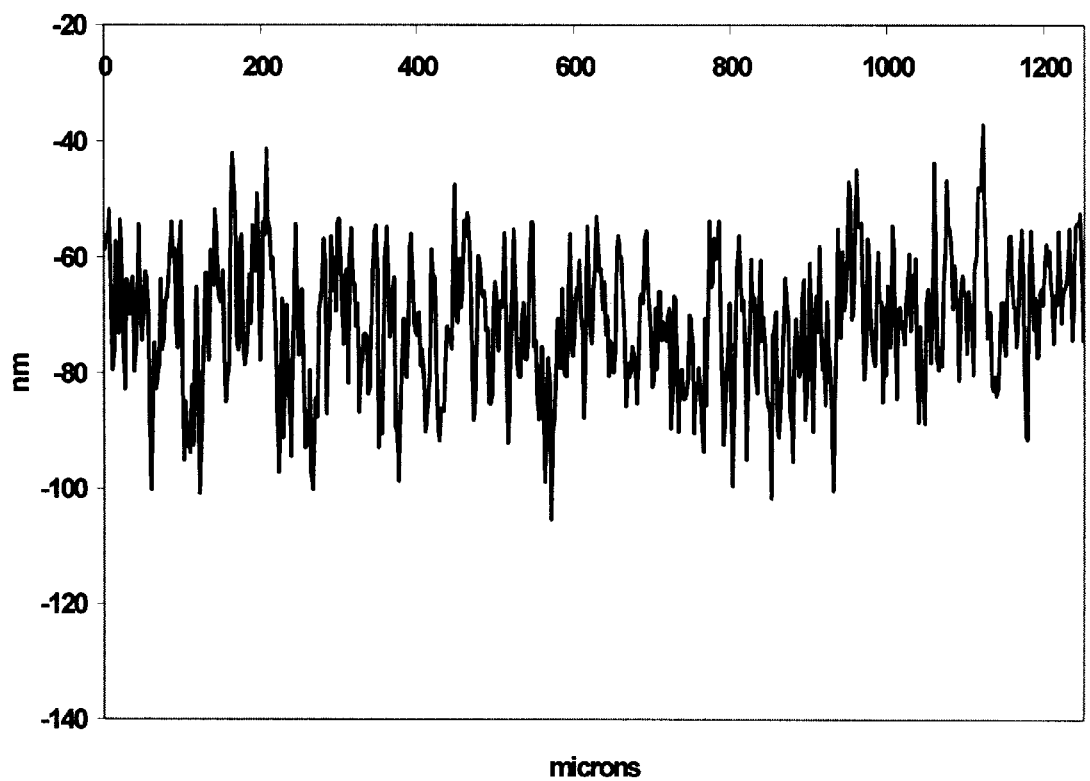
Figure 12A:
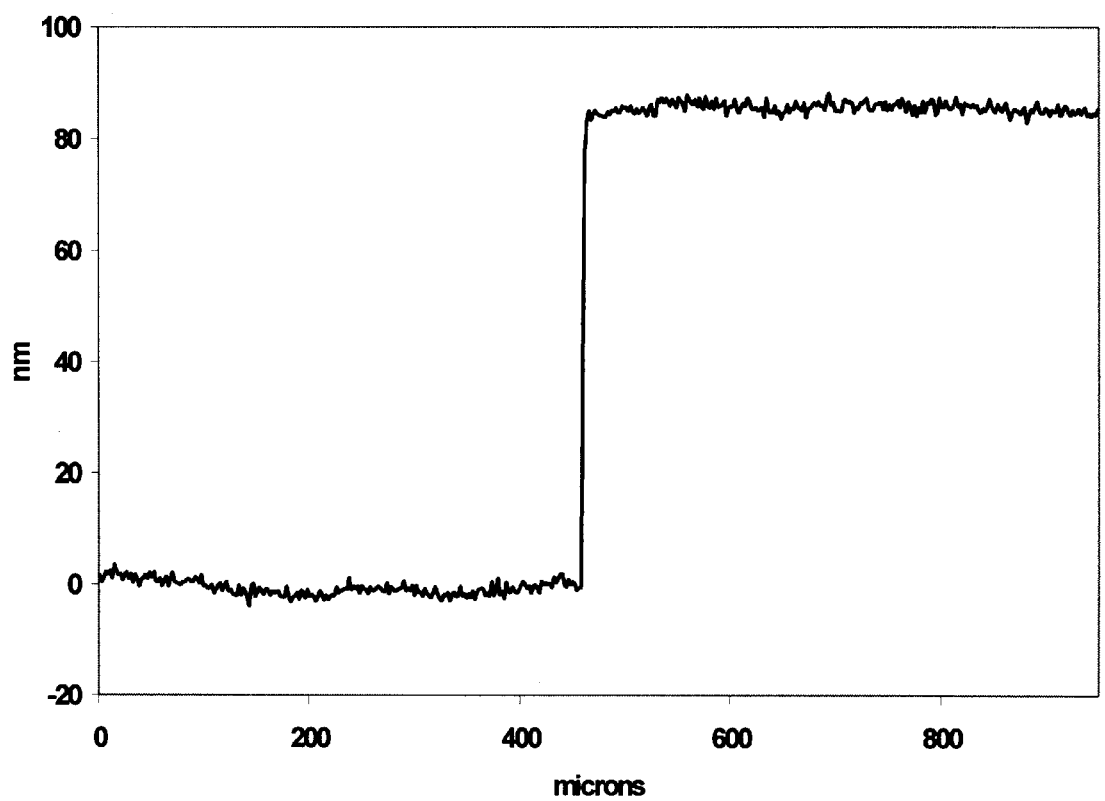
Figure 12B:
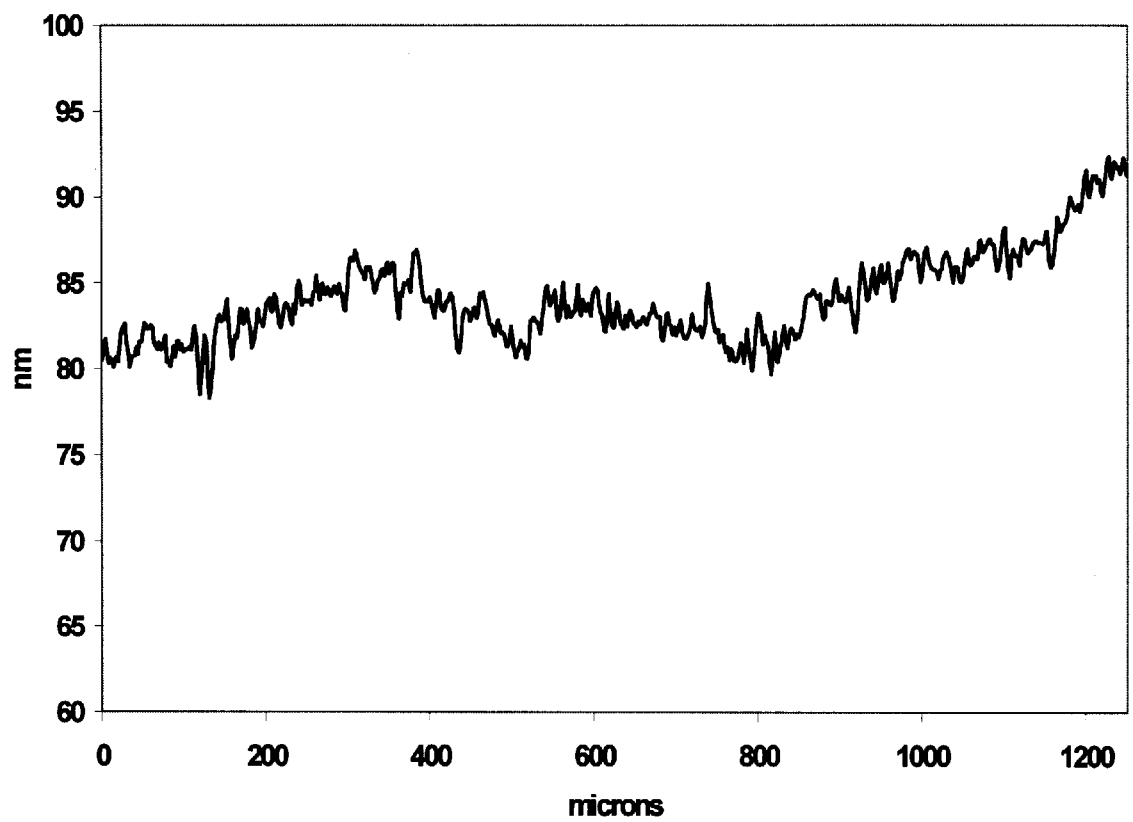
Figure 13:
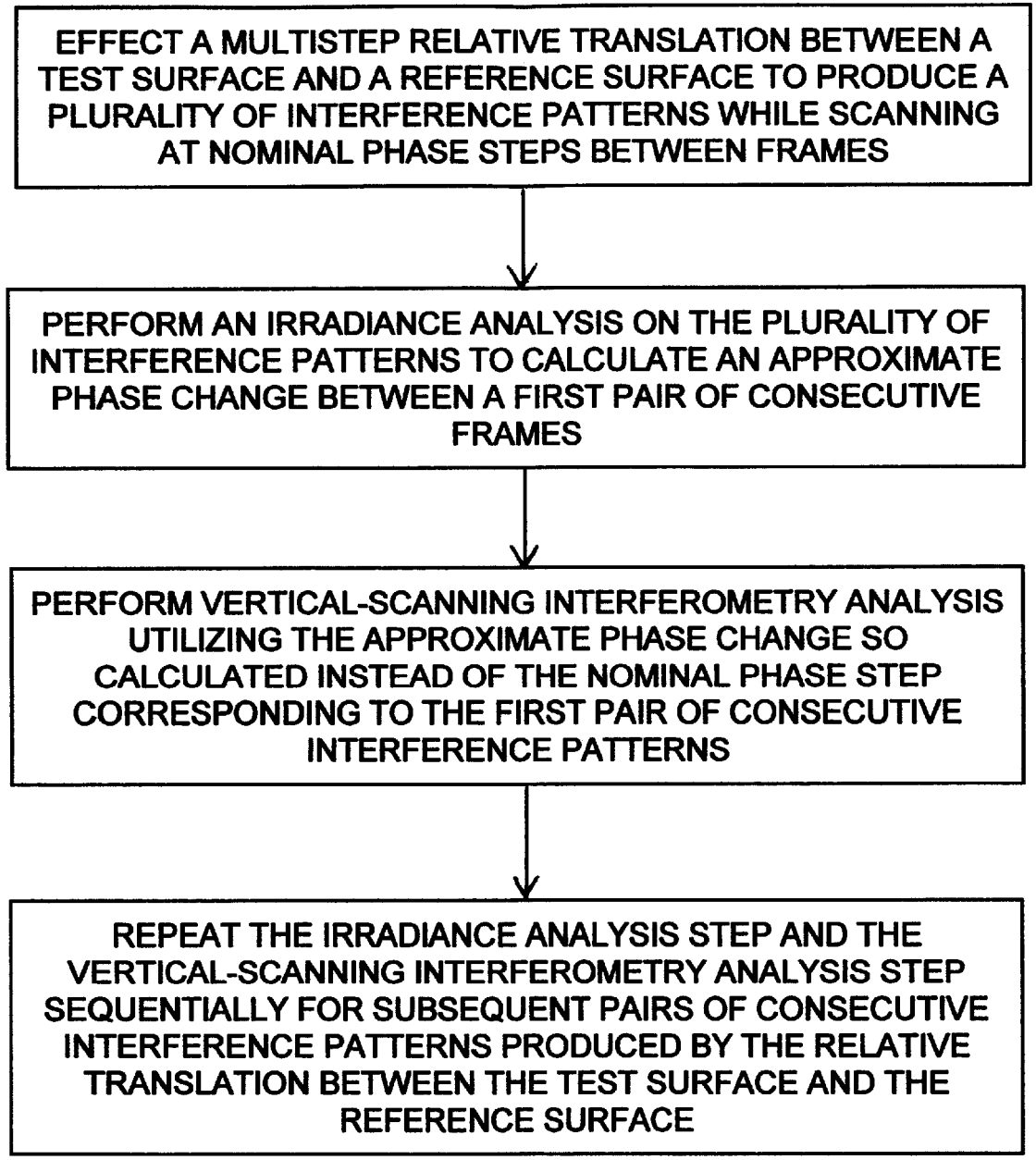
FIGS. 13 and 14 are schematic flow charts of the procedure of the invention as applied to vertical-scanning interferometry and phase-shifting interferometry, respectively.
Figure 14:
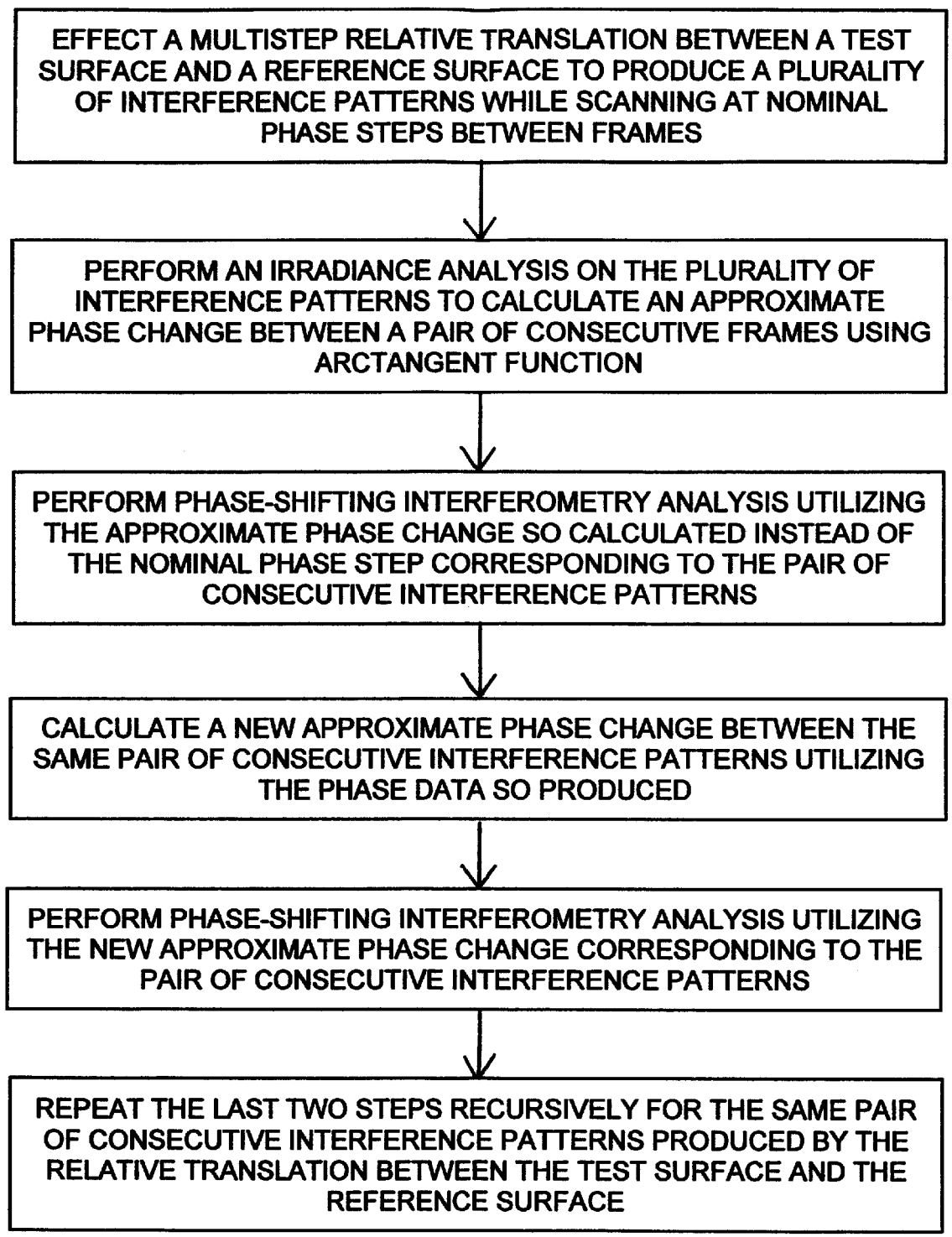

FIGS. 10–12 illustrate the results of the procedure of the invention for the same PSIOTF, VSI and PSI measurements, respectively, shown in FIGS. 1–3. The figures show that the phase-step errors evidenced by the saw-tooth, error-magnification, and ripple effects present in the uncorrected profiles have been significantly improved. FIGS. 13 and 14 are schematic flow charts of the procedure of the invention as it relates to vertical-scanning (white-light) interferometry and phase-shifting interferometry, respectively.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method of correcting scanning errors in an interferometric profilometer adapted to execute vertical-scanning interferometric measurements by illuminating a test surface and a reference surface aligned in an optical path to provide an interference pattern on an irradiance detector as the optical path difference between said test surface and reference surface is varied with a scanner calibrated to produce a sequence of nominal phase steps, the method comprising the following steps:

(a) illuminating said test surface and reference surface while effecting a multistep relative translation therebetween to produce a plurality of interference patterns on said detector, wherein each of said interference patterns is detected after a nominal phase step of the scanner;
    (b) performing an irradiance analysis on said plurality of interference patterns to calculate an approximate phase change between a first pair of consecutive interference patterns produced during said relative translation;
    (c) performing vertical-scanning interferometry analysis utilizing said approximate phase change calculated in step (b) instead of a nominal phase step corresponding to said first pair of consecutive interference patterns; and
    (d) repeating steps (a) through (c) for subsequent pairs of consecutive interference patterns produced by the relative translation between the test surface and the reference surface.

2. The method of claim 1, wherein said step (b) is carried out by calculating an average phase change for a plurality of consecutive nominal phase steps.

3. The method of claim 2, wherein said plurality of consecutive nominal phase steps is four.

4. The method of claim 2, wherein said step (b) is carried out for multiple detector pixels and said approximate phase step is an average of phase changes calculated for each of said multiple detector pixels.

5. A method of correcting scanning errors in an interferometric profilometer adapted to execute vertical-scanning interferometric measurements by illuminating a test surface and a reference surface aligned in an optical path to provide an interference pattern on an irradiance detector as the optical path difference between said test surface and reference surface is varied with a scanner calibrated to produce a sequence of nominal phase steps, the method comprising the following steps:

(a) illuminating said test surface and reference surface while effecting a multistep relative translation therebetween to produce a plurality of interference patterns on said detector, wherein each of said interference patterns is detected after a nominal phase step of the scanner;
    (b) performing an irradiance analysis on said plurality of interference patterns to calculate an approximate phase change between a first pair of consecutive interference patterns produced during said relative translation;
    (c) performing vertical-scanning interferometry analysis utilizing said approximate phase change calculated in step (b) instead of a nominal phase step corresponding to said first pair of consecutive interference patterns; and
    (d) repeating steps (a) through (c) for subsequent pairs of consecutive interference patterns produced by the relative translation between the test surface and the reference surface;
    wherein said step (b) is carried out by calculating the approximate phase step between frames using the equation $$\Delta\Phi_n = \arctan(N_n D_{n-1} - D_n N_{n-1})/(N_n N_{n-1} + D_n D_{n-1}),$$

where indices n and n−1 correspond to frames n and n−1 between which the approximate phase step $\Delta\Phi_n$ is being calculated; and where N and D are numerical approximations of $\int_o^{2\pi} I(z)\sin(z)dz$ and $\int_o^{2\pi} I(z)\cos(z)dz$, respectively, z being scan position, and I(z) being light intensity measured at scan position z.

6. The method of claim 5, wherein N=2(I4−I2) and D=(I1−2I3+I5), where I1–I5 are five light intensity values for five corresponding consecutive frames.

7. The method of claim 1, wherein said vertical-scanning interferometric analysis is carried out on-the-fly.

8. The method of claim 1, wherein each of said nominal phase steps corresponds approximately to a phase step of $\pi/2$.

9. The method of claim 1, wherein each of said nominal phase steps corresponds approximately to a phase step of $3\pi/2$.

10. A method of correcting scanning errors in an interferometric profilometer adapted to execute phase-shifting interferometric measurements by illuminating a test surface and a reference surface aligned in an optical path to provide an interference pattern on an irradiance detector as the optical path difference between said test surface and reference surface is varied with a scanner calibrated to produce a sequence of nominal phase steps, the method comprising the following steps:

(a) illuminating said test surface and reference surface while effecting a multistep relative translation therebetween to produce a plurality of interference patterns on said detector, wherein each of said interference patterns is detected after a nominal phase step of the scanner;

(b) performing an irradiance analysis on said plurality of interference patterns to calculate an approximate phase change between a pair of consecutive interference patterns produced during said relative translation using an arctangent function of numerical approximations of a phase difference between said pair of consecutive interference patterns;

(c) performing phase-shifting interferometry analysis utilizing said approximate phase change;

(d) calculating a new phase change between said pair of consecutive interference patterns utilizing phase data produced by step (c); and (e) performing phase-shifting interferometry analysis utilizing said new approximate phase change.

11. The method of claim 10, wherein said step (b) is carried out by calculating an average phase change for a plurality of consecutive nominal phase steps.

12. The method of claim 11, wherein said plurality of consecutive nominal phase steps is four.

13. The method of claim 11, wherein said step (b) is carried out for multiple detector pixels and said approximate phase step is an average of phase changes calculated for each of said multiple detector pixels.

14. The method of claim 10, wherein said step (b) is carried out by calculating the approximate phase step between frames using the equation $$\Delta\Phi_n = \arctan(N_n D_{n-1} - D_n N_{n-1})/(N_n N_{n-1} + D_n D_{n-1}),$$

where indices n and n−1 correspond to frames n and n−1 between which the approximate phase step $\Delta\Phi_n$ is being calculated; and where N and D are numerical approximations of $\int_o^{2\pi} I(z)\sin(z)dz$ and $\int_o^{2\pi} I(z)\cos(z)dz$, respectively, z being scan position, and I(z) being light intensity measured at scan position z.

15. The method of claim 14, wherein N=2(I4−I2) and D=(I1−2I3+I5), where I1−I5 are five light intensity values for five corresponding consecutive frames.

16. The method of claim 10, wherein said phase-shifting interferometry analysis is carried out on-the-fly.

17. The method of claim 10, wherein each of said nominal phase steps corresponds approximately to a phase step of π/2.

18. The method of claim 10, wherein each of said nominal phase steps corresponds approximately to a phase step of 3π/2.

19. The method of claim 10, further including the step of recursively repeating steps (d) and (e).

20. Apparatus for correcting scanning errors in an interferometric profilometer adapted to execute interferometric measurements by illuminating a test surface and a reference surface aligned in an optical path to provide an interference pattern on a light detector as the optical path difference between said test surface and reference surface is varied with a linear scanner calibrated to produce sequential nominal phase steps, the apparatus comprising:

(a) means for illuminating said test surface and reference surface while effecting a multistep relative translation therebetween to produce a plurality of interference patterns on said detector, wherein each of said interference patterns is detected after a nominal phase step of the scanner;

(b) means for performing irradiance analysis on said plurality of interference patterns to calculate a first approximate phase change between a first pair of consecutive interference patterns produced during said relative translation; and (c) means for performing interferometry analysis utilizing said first approximate phase change instead of a first nominal phase step corresponding to said first pair of consecutive interference patterns; and (e) means for calculating a new approximate phase change between said first pair of consecutive interference patterns utilizing phase data produced by said phase-shifting interferometry; and means for performing phase-shifting interferometry analysis utilizing said new approximate phase change;

wherein said interferometric analysis includes phase-shifting interferometry.

21. The apparatus of claim 20, wherein said means for illuminating is a broadband light source, and said interferometric analysis includes white-light interferometry.

22. The apparatus of claim 21, further including means for performing irradiance analysis on said plurality of interference patterns to calculate a second approximate phase change between a second pair of consecutive interference patterns produced during said relative translation; and means for performing interferometry analysis utilizing said second approximate phase change instead of a second nominal phase step corresponding to said second pair of consecutive interference patterns.

23. The apparatus of claim 22, wherein said phase-shifting interferometry is carried out on-the-fly in conjunction with white-light interferometry.

24. The method of claim 5, wherein said step (b) is carried out for multiple detector pixels and said approximate phase step is an average of phase changes calculated for each of said multiple detector pixels.

25. The method of claim 5, wherein said vertical-scanning interferometric analysis is carried out on-the-fly.

26. The method of claim 5, wherein each of said nominal phase steps corresponds approximately to a phase step of π/2.

27. The method of claim 5, wherein each of said nominal phase steps corresponds approximately to a phase step of 3π/2.

* * * * *

UNITED STATES PATENT AND TRADEMARK OFFICE
CERTIFICATE OF CORRECTION

PATENT NO. : 6,624,893 B1
DATED : September 23, 2003
INVENTOR(S) : Joanna Schmit et al.

It is certified that error appears in the above-identified patent and that said Letters Patent is hereby corrected as shown below:

Title page,
Item [*] Notice, replace "Subject to any disclaimer, the term of this patent is extended or adjusted under 35 U.S.C. 154(b) by 0 days" with -- Subject to any disclaimer, the term of this patent is extended or adjusted under 35 U.S.C. 154(b) by 93 days --

Column 12,
Line 44, replace "22" with -- 20 --

Signed and Sealed this

Twelfth Day of October, 2004

JON W. DUDAS
*Director of the United States Patent and Trademark Office*